(12) United States Patent
Hasegawa et al.

(10) Patent No.: US 11,778,348 B2
(45) Date of Patent: Oct. 3, 2023

(54) CIRCUIT, APPARATUS, SYSTEM, MOVABLE OBJECT, AND SUBSTRATE

(71) Applicant: CANON KABUSHIKI KAISHA, Tokyo (JP)

(72) Inventors: So Hasegawa, Kanagawa (JP); Hideo Kobayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 112 days.

(21) Appl. No.: 17/551,733

(22) Filed: Dec. 15, 2021

(65) Prior Publication Data
US 2022/0210355 A1    Jun. 30, 2022

(30) Foreign Application Priority Data

Dec. 24, 2020  (JP) ................................ 2020-215241

(51) Int. Cl.
*H04N 25/709* (2023.01)
*H04N 25/75* (2023.01)
*B60R 1/22* (2022.01)

(52) U.S. Cl.
CPC .......... *H04N 25/709* (2023.01); *H04N 25/75* (2023.01); *B60R 1/22* (2022.01)

(58) Field of Classification Search
None
See application file for complete search history.

(56) References Cited

U.S. PATENT DOCUMENTS

2018/0176490 A1*  6/2018  Nakamizo ........... H01L 27/1464

FOREIGN PATENT DOCUMENTS

JP          2017073746 A        4/2017

* cited by examiner

*Primary Examiner* — Mark T Monk
(74) *Attorney, Agent, or Firm* — CANON U.S.A., INC. IP Division

(57) ABSTRACT

A circuit includes a comparator configured to compare an input signal and another signal and output a signal indicating a result of a comparison, and an element configured to limit an amplitude of the signal indicating the result of the comparison. In a case where a current flowing through the circuit is changed, the element is able to make an adjustment of a range of a change in the amplitude due to the change in the current.

20 Claims, 11 Drawing Sheets

CIRCUIT, APPARATUS, SYSTEM, MOVABLE OBJECT, AND SUBSTRATE

BACKGROUND

Field of the Disclosure

The aspect of the embodiments relates to an circuit, an apparatus including the circuit, and a system including the circuit, a movable object, and a substrate.

Description of the Related Art

Japanese Patent Application Laid-Open No. 2017-73746 discusses an imaging apparatus that includes an output circuit including an amplitude limiting element configured to limit an amplitude of an output signal of a comparator.

With the imaging apparatus discussed in Japanese Patent Application Laid-Open No. 2017-73746, the amplitude of the output signal is sometimes changed when the magnitude of a bias electric current of the output circuit is changed, and the amplitude limiting element cannot limit the amplitude of the output signal to a desired voltage.

SUMMARY

According to an aspect of the embodiments, a circuit includes a comparator configured to compare an input signal and another signal and output a signal indicating a result of the comparison, and an element configured to limit an amplitude of the signal indicating the result of a comparison. In a case where a current flowing through the circuit is changed, the element is able to make an adjustment of a range of a change in the amplitude due to the change in the current.

According to another aspect of the embodiments, a circuit includes a comparator configured to compare an input signal and another signal and output a signal indicating a result of the comparison, and an element configured to limit an amplitude of the signal indicating the result of the comparison, a current source configured to supply a current to the circuit. The element a first amplitude element, a second amplitude element connected to the first amplitude element in series, and a switch connected to the second amplitude element in parallel, or the element includes a first amplitude element, a second amplitude element connected to the first amplitude element in parallel, and a switch connected to the second amplitude element in series. The current source and the switch are controlled by a control unit.

Further features of the disclosure will become apparent from the following description of exemplary embodiments with reference to the attached drawings.

DESCRIPTION OF THE EMBODIMENTS

Various exemplary embodiments will be described below with reference to the accompanying drawings.

In the below-described exemplary embodiments, mainly an imaging apparatus, which is an example of a photoelectric conversion apparatus, will be described below as an example of an apparatus to which the disclosure is applicable. It should be noted that the exemplary embodiments are not limited to photoelectric conversion apparatuses and are also applicable to any other apparatuses. Furthermore, applications of the disclosure to photoelectric conversion apparatuses are not limited to imaging apparatuses. For example, the exemplary embodiments are also applicable to distance measuring apparatuses (apparatuses that measure a distance using focal point detection and/or time-of-flight (TOF)) and light metering apparatuses (apparatuses that measure an amount of incident light).

Figure 1:
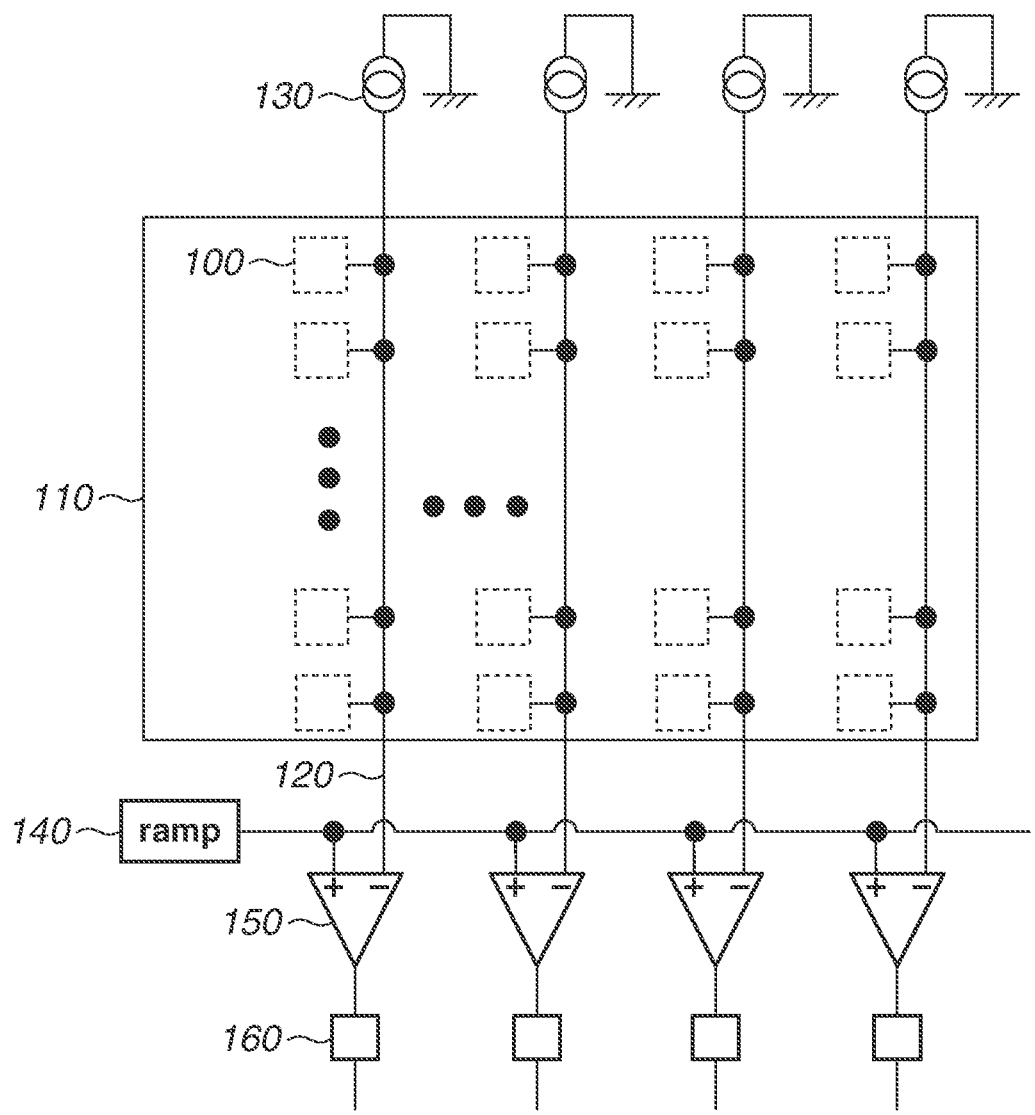
FIG. 1 is a schematic diagram illustrating a photoelectric conversion apparatus including an output circuit according to a first exemplary embodiment.

A first exemplary embodiment of the disclosure will be described below. FIG. 1 is a schematic diagram illustrating a photoelectric conversion apparatus including an output circuit according to the present exemplary embodiment.

The photoelectric conversion apparatus illustrated in FIG. 1 includes a pixel array 110 and an output circuit. The pixel array 110 includes pixels 100 arranged in an array form. The output circuit includes vertical output lines 120, electric current sources 130, a RAMP signal generation circuit 140, comparators 150, and pulse generation circuits 160.

The pixel array 110 includes the array of the plurality of pixels 100 arranged in a plurality of rows and a plurality of columns. Each pixel 100 converts incident light into an electric charge by photoelectric conversion and further converts the electric charge into a signal to output the signal based on the incident light. In each column of the pixel array 110, the vertical output line 120 extends in the column direction (longitudinal direction in FIG. 1). The vertical output line 120 is connected to each pixel 100 arranged in the column direction and forms a signal line shared by the connected pixels 100. While a single vertical output line is illustrated in FIG. 1, a plurality of vertical output lines corresponding to the number of bits of signals to be output can be connected.

The number of pixels 100 of the pixel array 110 is not particularly limited. For example, the pixel array 110 may include the pixels 100 arranged in several thousand rows and several thousand columns as in a general digital camera or may include the plurality of pixels 100 arranged in one row or in one column. Alternatively, the pixel array 110 may include one pixel 100.

The respective electric current source 130 supplies an electric current to a source follower transistor of pixels 100, and forms a source follower circuit together with the source follower transistor. Signals read from the pixels 100 through the source follower circuit serving as an output unit are output to the vertical output line 120.

One end of the vertical output line 120 of each column is connected to the comparator 150. Pixel signals read from the pixels 100 are input to the comparator 150 via the vertical output line 120.

The RAMP signal generation circuit 140, the comparator 150, and the pulse generation circuit 160 are an example of an analog digital conversion unit that performs analog/digital conversion (hereinafter, "AD conversion") on the signals output from the pixels 100. Two inputs of the comparator 150 are each connected to a different one of an output of the vertical output line 120 and an output of the RAMP signal generation circuit 140. The RAMP signal generation circuit 140 is an example of a reference signal source that outputs a reference signal for use in AD conversion of ramp signals.

The comparator 150 is a comparator that compares a potential of the vertical output line 120, which is an input signal, and an output potential of the RAMP signal generation circuit 140, which is the reference signal, and if the magnitude relationship between the potentials is reversed, the output potential of the comparator 150 is inverted from high to low or from low to high. A count value of an output of the pulse generation circuit 160 based on the inversion of the output potential of the comparator 150 is digital data. Signals to be input to the comparator 150 are not limited to those described above, and any comparators that can compare an input signal and a signal other than the input signal may be used.

Figure 2:
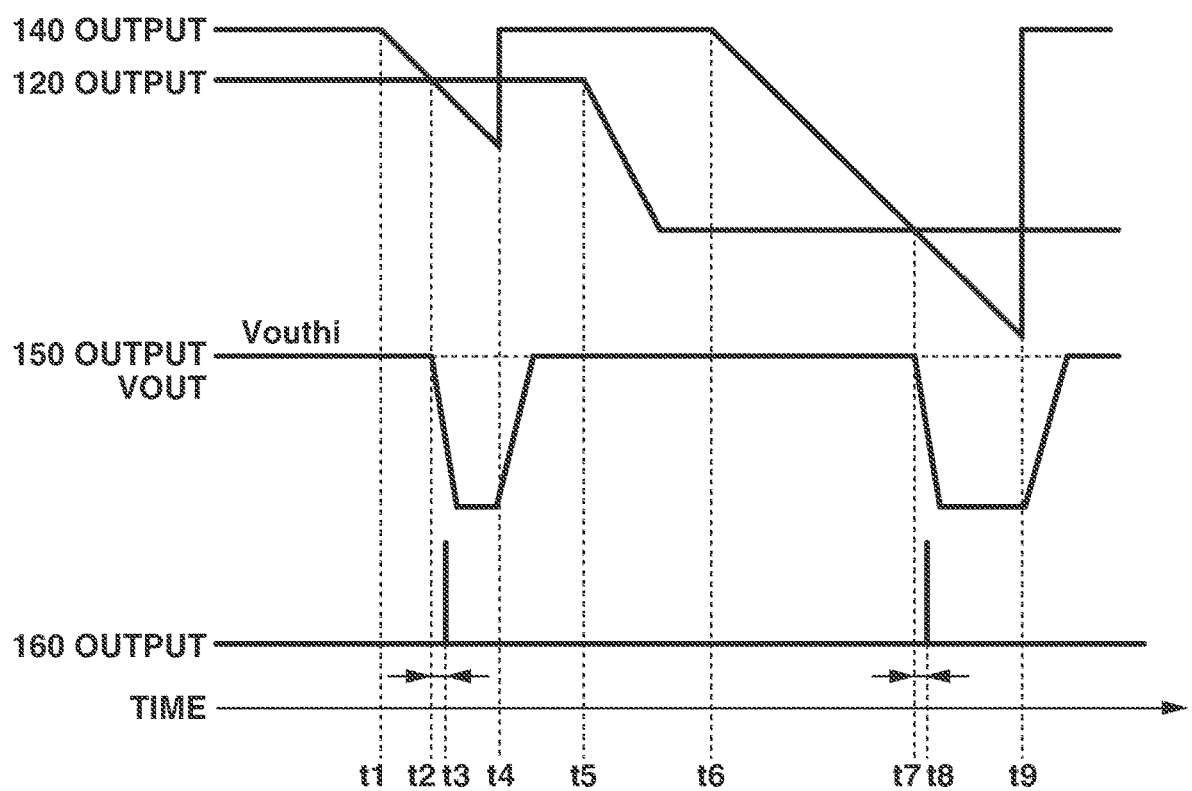
FIG. 2 is a schematic diagram illustrating a photoelectric conversion apparatus including an output circuit according to the first exemplary embodiment.

FIG. 2 is a timing chart illustrating an example of the AD conversion operation of the photoelectric conversion apparatus including the output circuit according to the present exemplary embodiment. The AD conversion operation of the photoelectric conversion apparatus will be described below with reference to FIG. 2. In the following description, the higher the luminance of incident light, the lower the pixel signal level through processing performed by a reading circuit 2.

At time t1, the RAMP signal generation circuit 140 outputs a ramp signal having a potential that drops with time. The ramp signal herein may be a signal having a potential that changes continuously with time or may be a signal having a potential that changes in the form of a saw with time. In the former case, a case where the change in the potential slows down at a rise of the potential is also allowed. Simultaneously, the vertical output line 120 outputs a voltage corresponding to a reset level of the pixel signal.

At time t2, the magnitude relationship between an output voltage of the vertical output line 120 and an output voltage of the RAMP signal generation circuit 140 is reversed, and an inversion of an output VOUT of the comparator 150 from low to high starts. In the inversion, the output VOUT has an amount of delay due to a gradient based on a slew rate.

At time t3, when the output VOUT of the comparator 150 becomes lower than a threshold value, the pulse generation circuit 160 generates a pulse signal and outputs the pulse signal. Through this operation, the reset level of the pixel signal is converted from analog to digital.

At time t4, the RAMP signal generation circuit 140 is reset, and the output of the RAMP signal generation circuit 140 returns to a reference potential. The reference potential herein refers to a potential at the time point when the potential of the ramp signal starts increasing. The output VOUT of the comparator 150 is also reset.

At time t5, the output VOUT of the vertical output line 120 reaches an optical signal level.

At time t6, the RAMP signal generation circuit 140 starts outputting the ramp signal.

At time t7, the output voltage of the vertical output line 120, which is to be input to the comparator 150, becomes equal to the output voltage of the RAMP signal generation circuit 140, and the inversion of the output VOUT of the comparator 150 starts.

At time t8, the pulse generation circuit 160 outputs a pulse with the amount of delay due to the gradient based on the slew rate of the output VOUT. Through this operation, the optical signal level of the pixel signal is converted from analog to digital. The difference between the digital value (digital data) of the optical signal level and the digital value (digital data) of the reset level is calculated to perform correlated double sampling (CDS), and digital data for use in image forming is obtained.

In the foregoing AD conversion operation, in a case where the amount of delay of the pulse generated at time t3 and time t8 is great, the AD conversion time is increased by the delay, and consequently the reading time of the photoelectric conversion apparatus increases.

When the plurality of comparators 150 is collectively inverted, a ground (GND) voltage and a power source voltage vary, and the voltage variations are transmitted as noise, which results in image quality degradation.

Specifically, the delay in the output of the comparator 150 and the voltage variation incident to the inversion operation of the comparator 150 affect the reading speed of the photoelectric conversion apparatus and the image quality. The amount of delay in the output of the comparator 150 is determined based on the slew rate of the output VOUT of the comparator 150 and a high level Vouthi of the output VOUT.

Figure 3:
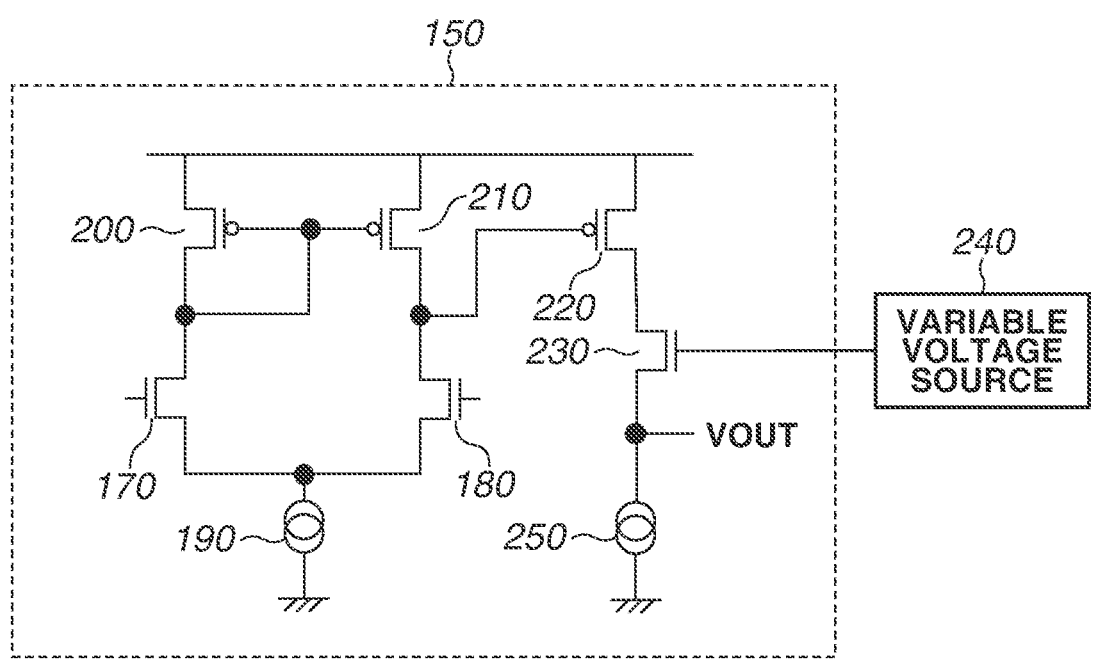
FIG. 3 is a timing chart of a photoelectric conversion apparatus including an output circuit according to the first exemplary embodiment.

FIG. 3 is a schematic diagram illustrating an example of the comparator 150 included in the output circuit according to the present exemplary embodiment.

The comparator 150 in FIG. 3 includes input transistors 170 and 180, an electric current source 190, current mirror transistors 200 and 210, an input transistor 220, an amplitude limiting element 230, a variable voltage source 240, and an electric current source 250.

The input transistors 170 and 180, the electric current source 190, and the current mirror transistors 200 and 210 form a differential stage. The input transistor 220, the amplitude limiting element 230, and the electric current source 250 form an amplifier stage. The output of the variable voltage source 240 is input in common to the comparators 150 of a plurality of columns.

With the comparator 150 illustrated in FIG. 3, the high level Vouthi of an output of the amplifier stage is decreased by the amplitude limiting element 230, and the amount of delay in the inversion and kickback to the other column circuits in the inversion are reduced.

As indicated by Equation (1), the high level Vouthi of the output voltage of the amplifier stage is determined by a bias voltage Vbias of the variable voltage source 240 and a gate-source voltage Vgs of the amplitude limiting element 230.

$$Vouthi = Vbias - Vgs \qquad \text{Equation (1)}$$

As indicated by Equation (2), the gate-source voltage Vgs of the amplitude limiting element 230 is determined by an element size of the amplitude limiting element 230, a flowing electric current Id, and a threshold voltage Vth.

$$Vgs = \sqrt{\frac{2LId}{\mu C_{ox} W}} + Vth \qquad \text{Equation (2)}$$

In Equation (2), μ is a carrier mobility, Cox is an oxide film capacity of the transistor per unit area, W is a channel width of the transistor, and L is a channel length of the transistor.

From Equations (1) and (2), the high level Vouthi of the amplifier stage output voltage is as expressed by Equation (3).

$$Vouthi = Vbias - \sqrt{\frac{2LId}{\mu C_{ox} W}} - Vth \qquad \text{Equation (3)}$$

For the purpose of power consumption reduction, there is a case where the amount of electric current supplied from the electric current source 250 is changed in accordance with an imaging mode. A case where two imaging modes that are a still image mode and a moving image mode are set will be described below as an example. In the still image mode, noise reduction is prioritized, whereas, in the moving image mode, power consumption reduction is prioritized. In the moving image mode, the amount of electric current is less than the amount of electric current in the still image mode. The change in the amount of electric current according to the imaging mode changes the gate-source voltage Vgs of the amplitude limiting element 230 based on Equation (2), and the high level Vouthi of the output voltage of the amplifier stage changes (Equation (3)).

For example, in a case where the imaging mode is changed from the still image mode to the moving image mode and the amount of electric current of the electric current source 250 is decreased, since decrease in the gate-source voltage Vgs increases the high level Vouthi, the delay in the output voltage of the amplifier stage in the inversion increases in accordance with the amount of the change.

Specifically, there is a concern that the reading time may increase in the imaging mode in which the amount of electric current is decreased to reduce power consumption.

In order to address this, the bias voltage Vbias is acquired from the variable voltage source 240 according to the present exemplary embodiment.

The bias voltage Vbias is set variable and is optimized for each imaging mode of a different electric current in order to maintain the high level Vouthi at a constant value, so that the reading time is reduced even in the imaging mode in which the amount of electric current of the comparator 150 is small.

For example, in a case where the amount of electric current of the electric current source 250 is decreased, the gate-source voltage Vgs is decreased based on Equation 2. The bias voltage Vbias, which is the output of the variable voltage source 240, is decreased by the amount of the decrease of the gate-source voltage Vgs, thus enabling the high level Vouthi to be kept constant (Equation 3). The output of the electric current source 250 and the output of the variable voltage source 240 are controlled by a control signal (bias voltage) supplied from a control unit (not illustrated).

As described above, according to the present exemplary embodiment, the limiting element is adjusted so as to reduce a change in amplitude of an output signal due to a change in electric current, so that the change in amplitude is corrected. Therefore, even in a case where the amount of electric current of the electric current source 250 is changed, the amplitude limiting voltage (output signal amplitude) Vouthi is maintained constant. Thus, the amount by which the reading time increases at the time of changing the imaging mode (at the time of decreasing the electric current) from the reading time in the previous imaging mode before the change is reduced to zero (the reading time remains the same) or to a smaller amount.

A second exemplary embodiment will be described below with reference to FIG. 4.

Figure 4:
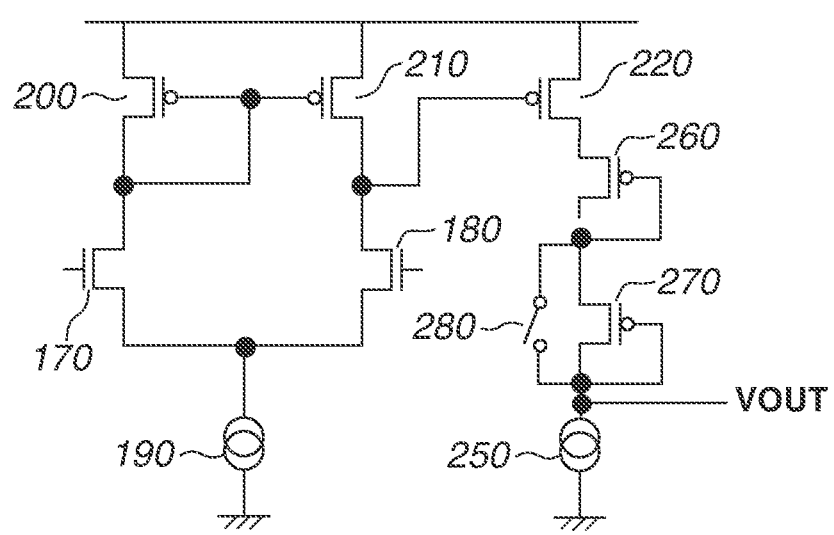
FIG. 4 is a schematic diagram illustrating a photoelectric conversion apparatus including an output circuit according to a second exemplary embodiment.

FIG. 4 is a schematic diagram illustrating a comparator of an output circuit according to the second exemplary embodiment. Each component in FIG. 4 that is similar to the corresponding component in FIG. 3 is given the same reference numeral as that in FIG. 3, and redundant descriptions thereof are omitted. Mainly differences from the first exemplary embodiment illustrated in FIG. 3 will be described below.

The comparator of a photoelectric conversion apparatus according to the second exemplary embodiment includes amplitude limiting elements 260 and 270 and a switch 280 in place of the amplitude limiting element 230 and the variable voltage source 240. The amplitude limiting elements 260 and 270 are diode connected, and the switch 280 is connected in parallel with the amplitude limiting element 270. The amplitude limiting elements 260 and 270 are connected in series. The electric current source 250 and the switch 280 are controlled by a control signal supplied from the control unit (not illustrated).

The amplitude limiting element 260 and 270 connected in series and the switch 280 are included in an amplitude limiting element (also referred to as "amplitude limiter") having a variable channel length according to the present exemplary embodiment.

Turning on the switch 280 disables the amplitude limiting element 270 and enables the amplitude limiting corresponding to one stage that is the amplitude limiting element 260. Turning off the switch 280 enables the amplitude limiting element 270 and enables the amplitude limiting corresponding to two stages that are the amplitude limiting elements 260 and 270. Specifically, the states that are different from each other in the number of amplitude limiting elements connected in series are set by turning on/off the switch 280. The phrase "the number of amplitude limiting elements connected" herein also refers to a case where the number of amplitude limiting elements is one. At this time, the substantial channel length of the amplitude limiting element becomes the sum of the channel lengths of the amplitude limiting elements 290 and 300.

For example, the switch 280 is turned on in changing the imaging mode from the still image mode in which the amount of electric current is high to the moving image mode in which the amount of electric current is low. Thus, in response to a change in the amount of electric current of the electric current source 250 incident to a change of the imaging mode, the number of amplitude limiting elements that are connected in series is changed, and the limiting element is adjusted so as to reduce a change in amplitude of the output signal that is caused by the change in electric current, thus correcting the change in amplitude. This maintains the high level (output signal amplitude) Vouthi of the output voltage of the amplifier stage constant, and the reading time when the imaging mode is changed (when the amount of electric current is decreased) is improved. Specifically, the amount by which the reading time increases at the time of changing the imaging mode (at the time of decreasing the electric current) from the reading time in the previous imaging mode before the change is reduced to zero (the reading time remains the same) or to a lower amount.

According to the present exemplary embodiment, a configuration in which a single variable voltage source supplies a common voltage to comparators of a plurality of columns is not included, and therefore image quality degradation originating from noise transmitted through a common line in the configuration does not occur.

A third exemplary embodiment will be described below with reference to FIG. 5.

Figure 5:
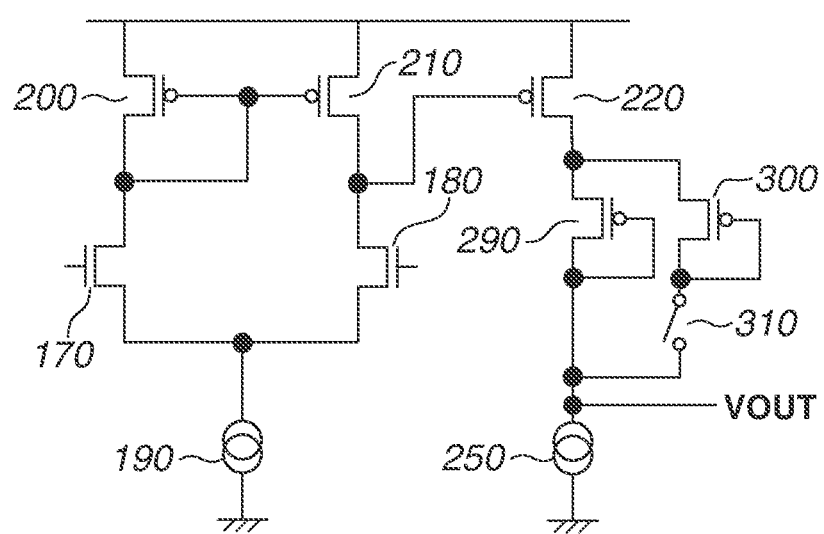
FIG. 5 is a schematic diagram illustrating a photoelectric conversion apparatus including an output circuit according to a third exemplary embodiment.

FIG. 5 is a schematic diagram illustrating a comparator of an output circuit according to the third exemplary embodiment. Each component in FIG. 5 that is similar to the corresponding component in FIG. 3 is given the same reference numeral as that in FIG. 3, and redundant descriptions thereof are omitted. Mainly differences from the first exemplary embodiment will be described below.

According to the third exemplary embodiment, as illustrated in FIG. 5, amplitude limiting elements 290 and 300 are included in place of the amplitude limiting element 230 and the variable voltage source 240. The amplitude limiting elements 290 and 300 are diode connected. A switch 310 is connected with the amplitude limiting element 300 in series, and the amplitude limiting elements 290 and 300 are connected in parallel.

The amplitude limiting elements 290 and 300 connected in parallel and the switch 310 are included in an amplitude limiting element (also referred to as "amplitude limiter") having a variable channel width according to the present exemplary embodiment. The electric current source 250 and the switch 310 are controlled by a control signal supplied from the control unit (not illustrated).

In FIG. 5, turning on the switch 310 enables the amplitude limiting element 300, and the substantial channel width of the amplitude limiting element becomes the sum of the channel widths of the amplitude limiting elements 290 and 300. Turning off the switch 310 disables the amplitude limiting element 300, and the amplitude limiting which is performed by the amplitude limiting element 290 alone is enabled. Specifically, the states that are different from each other in the number of amplitude limiting elements connected in parallel are set by turning on/off the switch 310.

For example, the switch 310 is turned on in changing the imaging mode from the still image mode in which the amount of electric current is high to the moving image mode in which the amount of electric current is low. As described above, in response to a change in the amount of electric current of the electric current source 250 incident to a change of the imaging mode, the channel width of the amplitude limiting element is changed so that the limiting element is adjusted to reduce a change in amplitude of an output signal that is caused by a change in electric current, thus correcting the change in amplitude. This maintains the amplitude of the output signal of the amplifier stage constant, and the amount by which the reading time increases at the time of changing the imaging mode (at the time of decreasing the electric current) from the reading time in the previous imaging mode before the change is reduced to zero (the reading time remains the same) or to a lower amount.

According to the present exemplary embodiment, a configuration in which a single variable voltage source supplies a common voltage to comparators of a plurality of columns is not included, and therefore image quality degradation originating from noise transmitted through a common line in the configuration does not occur.

A fourth exemplary embodiment will be described below with reference to FIG. 6.

Figure 6:
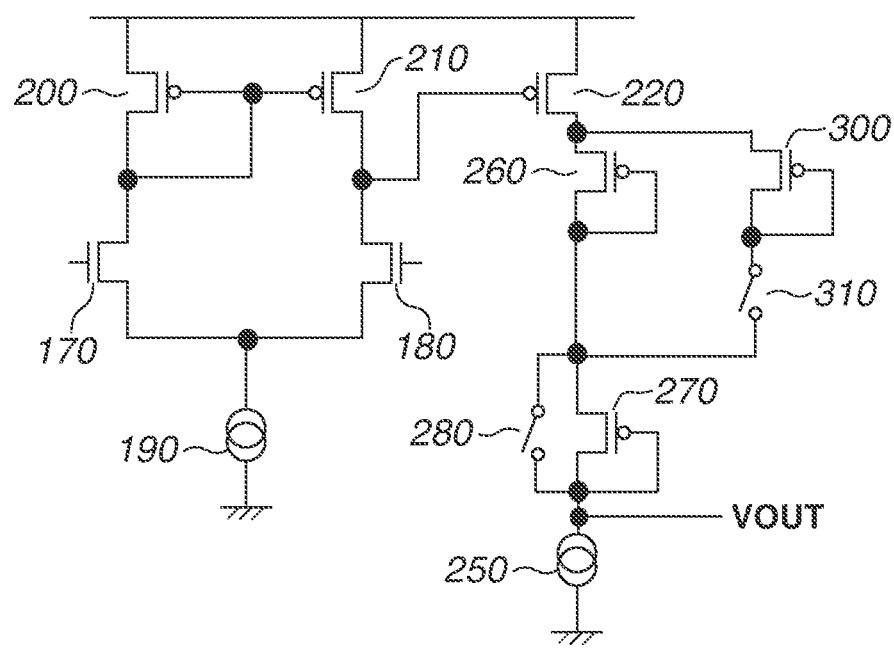
FIG. 6 is a schematic diagram illustrating a photoelectric conversion apparatus including an output circuit according to a fourth exemplary embodiment.

FIG. 6 is a schematic diagram illustrating a comparator of an output circuit according to the fourth exemplary embodiment. Each component in FIG. 6 that is similar to the corresponding component in FIGS. 4 and 5 is given the same reference numeral as that in FIGS. 4 and 5, and redundant descriptions thereof are omitted. Mainly differences from the first exemplary embodiment will be described below.

According to the fourth exemplary embodiment, as illustrated in FIG. 6, the amplitude limiting elements 260, 270, and 300 and the switches 280 and 310 are included in place of the amplitude limiting element 230 and the variable voltage source 240. The switch 280 is connected with the amplitude limiting element 270 in parallel, and the switch 310 is connected with the amplitude limiting element 300 in series. The amplitude limiting elements 260 and 270 are connected in series, and the amplitude limiting elements 260 and 300 are connected in parallel.

The amplitude limiting elements 260 and 270 connected in series, the amplitude limiting elements 260 and 300 connected in in parallel, and the switches 280 and 310 are included in an amplitude limiting element (also referred to as "amplitude limiter") having a variable channel width according to the present exemplary embodiment. The electric current source 250 and the switches 280 and 310 are controlled by a control signal supplied from the control unit (not illustrated).

In other words, the present exemplary embodiment is a composite exemplary embodiment of the second and third exemplary embodiments described above.

In FIG. 6, turning on the switch 280 and turning off the switch 310 disable the amplitude limiting elements 270 and 300 and enable the amplitude limiting corresponding to one stage of the amplitude limiting element 260.

Turning on the switch 310 while the switch 280 is on enables the amplitude limiting element 300, and the channel width of the amplitude limiting element becomes the sum of the channel widths of the amplitude limiting elements 260 and 300.

Further turning off the switch 280 enables the amplitude limiting element 270, so that the amplitude limiting corresponding to the two stages, the amplitude limiting element of the upper stage having the channel width that becomes the sum of the channel widths of the amplitude limiting elements 260 and 300 and the amplitude limiting element 270, is enabled.

Turning off both the switches 280 and 310 enables the amplitude limiting corresponding to two stages that are the amplitude limiting elements 260 and 270.

As described above, in response to a change in the amount of electric current of the electric current source 250 incident to a change in the imaging mode, the number of amplitude limiting elements connected in series and the number of amplitude limiting elements connected in parallel are changed, and the limiting element is adjusted so as to reduce a change in amplitude of the output signal that is caused by the change in electric current, thus correcting the change in amplitude. For example, in a case where the imaging mode is the still image mode in which the amount of electric current is high, the switch 310 is turned on and the switch 280 is turned off, whereas in a case where the imaging mode is the moving image mode in which the amount of electric current is low, the switches 310 and 280 are both turned off. This maintains the high level (output signal amplitude) Vouthi of the output voltage of the amplifier stage constant. Thus, the amount by which the reading time increases at the time of changing the imaging mode (at the time of decreasing the electric current) from the reading time in the previous imaging mode before the change is reduced to zero (the reading time remains the same) or to a smaller amount.

Furthermore, with the amplifier stage including the three amplitude limiting elements in combination as described above, the number of imaging modes that are supportable can be increased as compared to the second and third exemplary embodiments.

The number of amplitude limiting elements for use in combination is not limited to that described above and can be four or more, and the number of amplitude limiting elements and the number of switches can be changed in accordance with the number of imaging modes to be used by switching.

According to the present exemplary embodiment, as in the second and third exemplary embodiments, a configuration in which a single variable voltage source supplies a common voltage to comparators of a plurality of columns is not included, and therefore image quality degradation originating from noise transmitted through a common line in the configuration does not occur.

A fifth exemplary embodiment will be described below with reference to FIG. 7.

Figure 7:
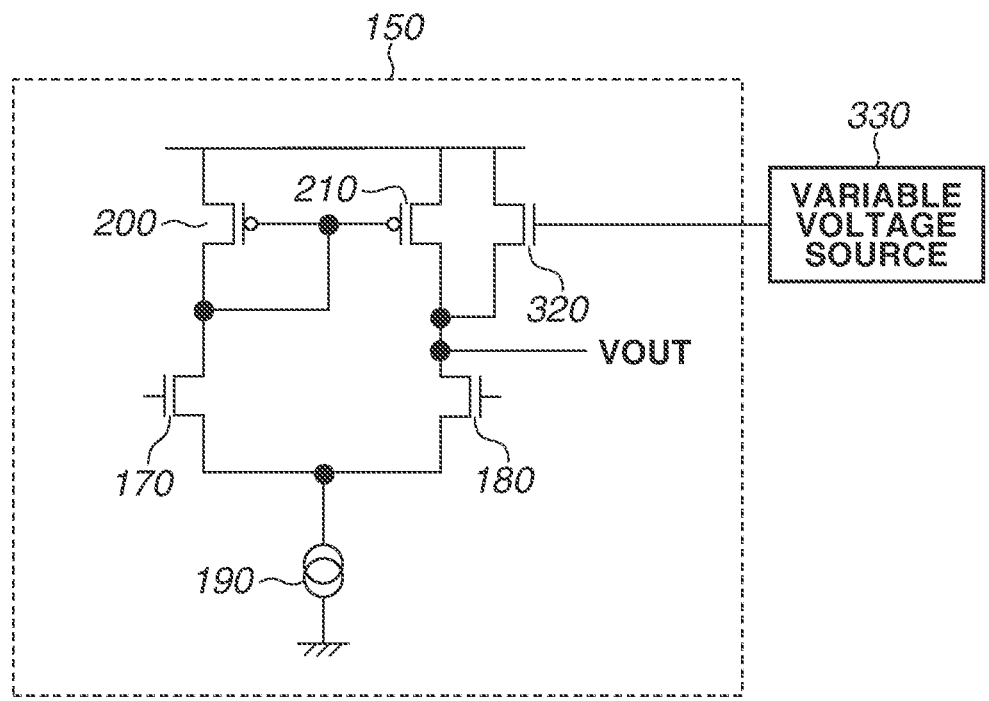
FIG. 7 is a schematic diagram illustrating a photoelectric conversion apparatus including an output circuit according to a fifth exemplary embodiment.

FIG. 7 is a schematic diagram illustrating a comparator of an output circuit according to the fifth exemplary embodiment. Each component in FIG. 7 that is similar to the corresponding component in FIG. 3 is given the same reference numeral as that in FIG. 3, and redundant descriptions thereof are omitted. Mainly differences from the first exemplary embodiment illustrated in FIG. 3 will be described below.

An application of the disclosure to not only the output of the amplifier stage of the comparator 150 according to the first exemplary embodiment but also to the output of the differential stage of the comparator 150 makes it possible to limit the output signal amplitude to a desired voltage even in a case where the bias electric current is changed.

A case where the disclosure is applied to a differential stage that includes an amplitude limiting element 320 connected with the current mirror transistor 210 in parallel according to the fifth exemplary embodiment will be described below. The comparator 150 illustrated in FIG. 7 includes the amplitude limiting element 320 and a variable voltage source 330. The amplitude limiting element 320 is connected with the current mirror transistor 210 in parallel. The variable voltage source 330 is used for the comparators 150 of all columns and inputs a voltage to the comparators 150 under control based on a control signal supplied from the control unit (not illustrated).

A low level of the output signal (voltage) of the differential stage is determined based on the amount of electric current, the electric current Id flowing through the amplitude limiting element 320, and the threshold voltage Vth. The electric current Id is determined based on the element size. Increasing the amount of electric current of the differential stage decreases the low level, and the delay in the inversion of the output of the differential stage increases. This increases the reading time of the photoelectric conversion apparatus. As a result of the increase in output signal amplitude, kickback is enhanced, and image quality degradation occurs.

According to the present exemplary embodiment, in response to a change in the amount of electric current of the electric current source 190 incident to a change of the imaging mode, a bias voltage supplied from the variable voltage source 330 is adjusted. For example, the output of the variable voltage source 330 is increased in changing the imaging mode from the still image mode, in which the amount of electric current is high, to the moving image mode, in which the amount of electric current is low, thus increasing the low level of the output signal of the differential stage. This adjusts the limiting element to reduce a change in amplitude of the output signal that is caused by the change in electric current, and the change in amplitude is corrected, so that the output signal amplitude is maintained constant. Thus, the amount by which the reading time increases at the time of changing the imaging mode (at the time of decreasing the electric current) from the reading time in the previous imaging mode before the change is reduced to zero (the reading time remains the same) or to a lower amount.

A sixth exemplary embodiment will be described below with reference to FIG. 8.

Figure 8:
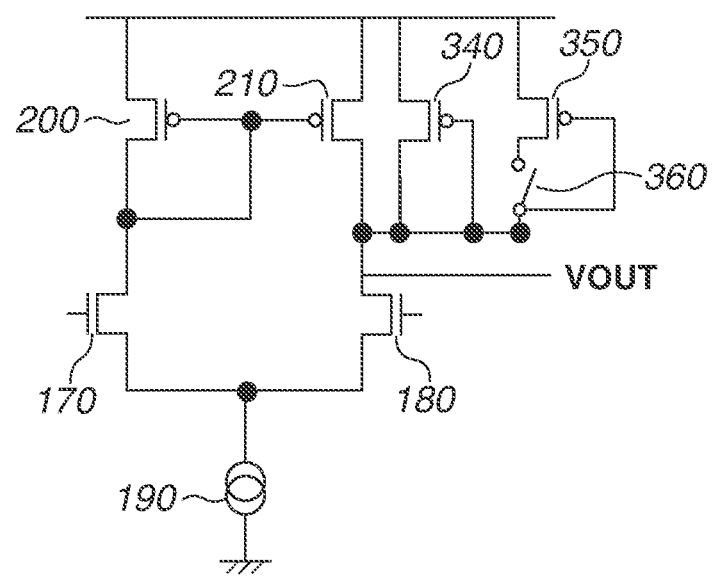
FIG. 8 is a schematic diagram illustrating a photoelectric conversion apparatus including an output circuit according to a sixth exemplary embodiment.

FIG. 8 is a schematic diagram illustrating a photoelectric conversion apparatus including an output circuit according to a sixth exemplary embodiment. Each component in FIG. 8 that is similar to the corresponding component in FIG. 7 is given the same reference numeral as that in FIG. 7, and redundant descriptions thereof are omitted. Mainly differences from the fifth exemplary embodiment illustrated in FIG. 7 will be described below.

A differential stage of a comparator according to the sixth exemplary embodiment includes amplitude limiting elements 340 and 350 connected with the current mirror transistor 210 in parallel and a switch 360 connected with the amplitude limiting element 350 in series. The electric current source 190 and the switch 360 are controlled by a control signal supplied from the control unit (not illustrated).

Turning on the switch 360 enables the amplitude limiting element 350, and the channel width of the amplitude limiting element becomes the sum of the channel widths of the amplitude limiting elements 340 and 350. Turning off the switch 360 disables the amplitude limiting element 350, and the amplitude limiting which is performed by the amplitude limiting element 340 alone is enabled. As described above, the channel width of the amplitude limiting element can be changed by switching the switch 360.

For example, a switch 360 is turned on in changing the imaging mode from the still image mode, in which the amount of electric current is high, to the moving image mode, in which the amount of electric current is low. As described above, In response to a change in the amount of electric current of the electric current source 190 incident to a change of the imaging mode, the channel width of the amplitude limiting element is changed so that the amplitude limiting element is adjusted to reduce a change in amplitude of the output signal that is caused by the change in electric current. This corrects the change in amplitude, and the amplitude of the output signal of the differential stage is maintained constant.

Thus, the amount by which the reading time increases at the time of changing the imaging mode (at the time of decreasing the electric current) from the reading time in the previous imaging mode before the change is reduced to zero (the reading time remains the same) or to a lower amount.

A seventh exemplary embodiment will be described below with reference to FIG. 9.

Figure 9:
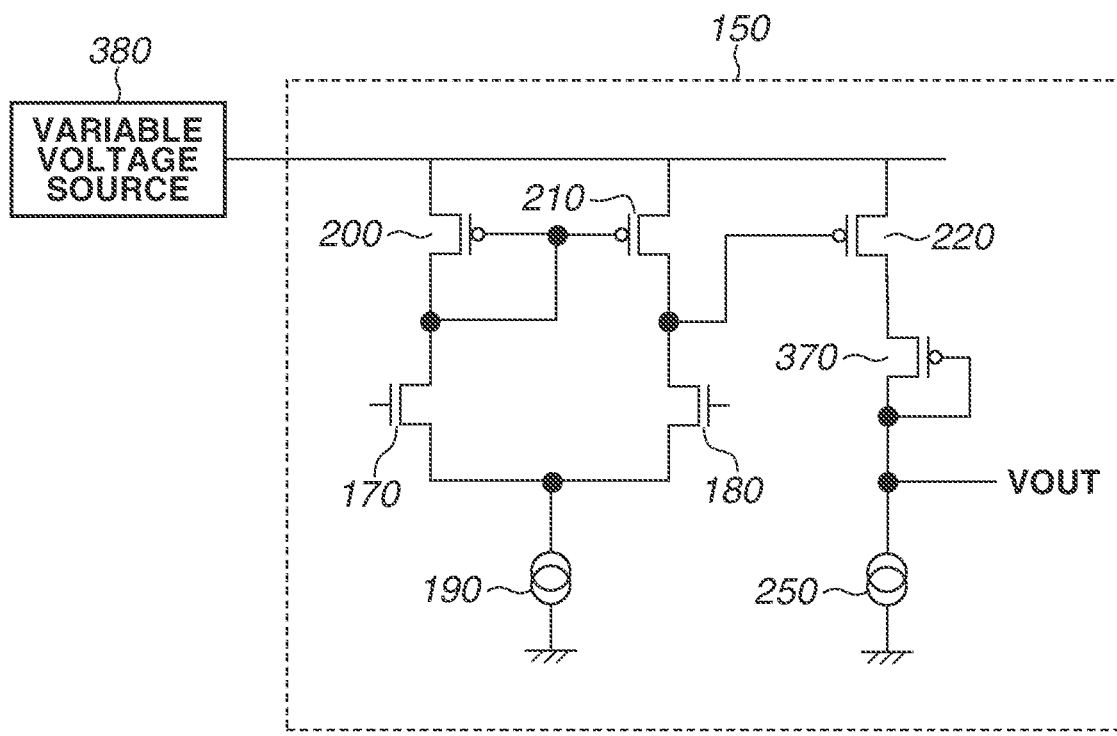
FIG. 9 is a schematic diagram illustrating a photoelectric conversion apparatus including an output circuit according to a seventh exemplary embodiment.

FIG. 9 is a schematic diagram illustrating a photoelectric conversion apparatus including an output circuit according to the seventh exemplary embodiment. Each component in FIG. 9 that is similar to the corresponding component in FIG. 3 is given the same reference numeral as that in FIG. 3, and redundant descriptions thereof are omitted. Mainly differences from the first exemplary embodiment illustrated in FIG. 3 will be described below.

The output circuit according to the seventh exemplary embodiment includes an amplitude limiting element 370 and a variable voltage source 380.

An output of the variable voltage source 380 is connected, as a power source voltage of the comparator 150, to an amplifier stage including the amplitude limiting element 370 and to a differential stage. The electric current source 250 and the variable voltage source 380 are controlled by a control signal supplied from the control unit (not illustrated).

Changing the imaging mode and decreasing the amount of electric current supplied from the electric current source 250 of the amplifier stage decrease the electric current Id of the amplitude limiting element 370, and the high level Vouthi of the output voltage of the amplifier stage increases.

According to the present exemplary embodiment, in response to a change in the amount of electric current of the electric current source 250 incident to the imaging mode, the voltage output from the variable voltage source 380 is decreased so that the limiting element is adjusted to reduce a change in amplitude of the output signal that is caused by the change in electric current, thus correcting the change in amplitude. For example, in a case where the imaging mode is changed from the still image mode, in which the amount of electric current is high, to the moving image mode, in which the amount of electric current is low, the voltage output from the variable voltage source 380 is decreased to maintain the amplitude (output signal amplitude) of the output voltage of the differential stage constant. Thus, the amount by which the reading time increases at the time of changing the imaging mode from the reading time in the previous imaging mode before the change is reduced to zero (the reading time remains the same) or to a lower amount.

Figure 10:
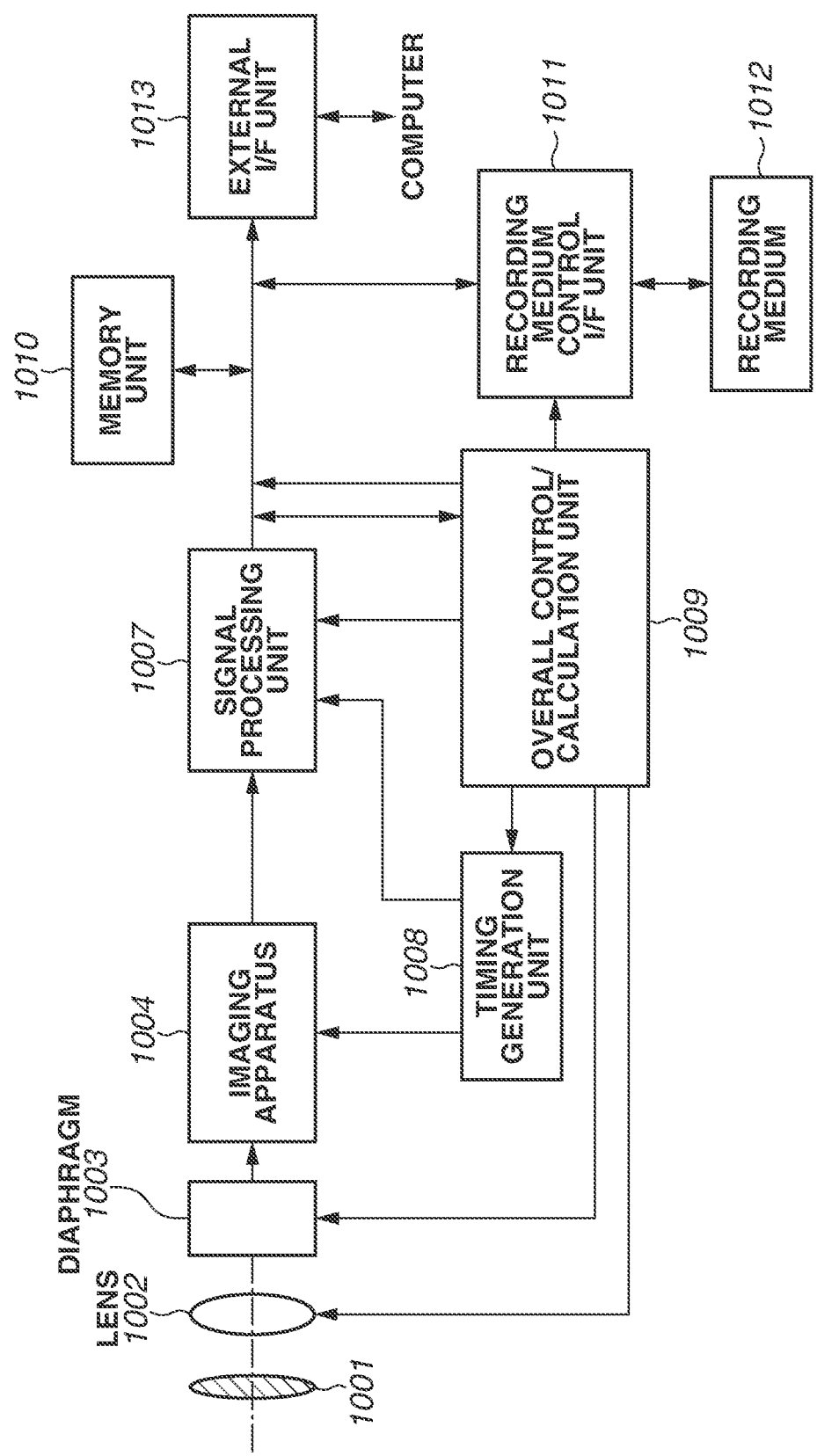
FIG. 10 is a diagram illustrating a configuration of a photoelectric conversion system according to an eighth exemplary embodiment.

A photoelectric conversion system according to an eighth exemplary embodiment will be described below with reference to FIG. 10. FIG. 10 is a block diagram illustrating a schematic configuration of the photoelectric conversion system according to the present exemplary embodiment.

The photoelectric conversion apparatuses according to the first to seventh exemplary embodiments described above are applicable to various photoelectric conversion systems. Examples of applicable photoelectric conversion systems include digital still cameras, digital camcorders, monitoring cameras, copying machines, facsimiles, mobile phones, in-vehicle cameras, and observation satellites. A camera module that includes an optical system, such as a lens, and an imaging apparatus is also included in the photoelectric conversion systems. FIG. 10 is a block diagram illustrating a digital still camera as an example thereof.

The photoelectric conversion system illustrated as an example in FIG. 10 includes an imaging apparatus 1004 and a lens 1002. The imaging apparatus 1004 is an example of a photoelectric conversion apparatus. The lens 1002 forms an optical image of a subject on the imaging apparatus 1004. The photoelectric conversion system further includes a diaphragm 1003 and a barrier 1001. The diaphragm 1003 varies the amount of light that passes through the lens 1002. The barrier 1001 protects the lens 1002. The lens 1002 and the diaphragm 1003 are an optical system that gathers light to the imaging apparatus 1004. The imaging apparatus 1004 is one of the photoelectric conversion apparatuses according to the above-described exemplary embodiments and converts an optical image formed by the lens 1002 into an electric signal.

The photoelectric conversion system includes a signal processing unit 1007. The signal processing unit 1007 is an image generation unit that generates an image by processing an output signal output from the imaging apparatus 1004. The signal processing unit 1007 performs various types of correction and compression as needed and outputs image data. The signal processing unit 1007 may be formed on a semiconductor substrate on which the imaging apparatus 1004 is situated or may be formed on another semiconductor substrate different from the semiconductor substrate on which the imaging apparatus 1004 is formed.

The photoelectric conversion system further includes a memory unit 1010 and an external interface unit (external I/F unit) 1013. The memory unit 1010 temporarily stores image data. The external I/F unit 1013 is used for communication with an external computer. The photoelectric conversion system further includes a recording medium 1012 and a recording medium control interface unit (recording medium control I/F unit) 1011. The recording medium 1012 is a semiconductor memory for recording or reading imaging data. The recording medium control I/F unit 1011 is used for recording to and reading from the recording medium 1012. The recording medium 1012 may be a built-in recording medium in the photoelectric conversion system or a removable recording medium.

The photoelectric conversion system further includes an overall control/calculation unit 1009 and a timing generation unit 1008. The overall control/calculation unit 1009 controls various computations and the entire digital still camera. The timing generation unit 1008 outputs various timing signals to the imaging apparatus 1004 and the signal processing unit 1007. The various timing signals may be input externally, and it is only required for the photoelectric conversion system to include at least the imaging apparatus 1004 and the signal processing unit 1007 for processing output signals output from the imaging apparatus 1004.

The imaging apparatus 1004 outputs an imaging signal to the signal processing unit 1007. The signal processing unit 1007 performs predetermined signal processing on an imaging signal output from the imaging apparatus 1004 and outputs image data. The signal processing unit 1007 generates an image using the imaging signal.

As described above, according to the present exemplary embodiment, a photoelectric conversion system to which one of the photoelectric conversion apparatuses (imaging apparatuses) according to the above-described exemplary embodiments is applied is realized.

Figure 11A:
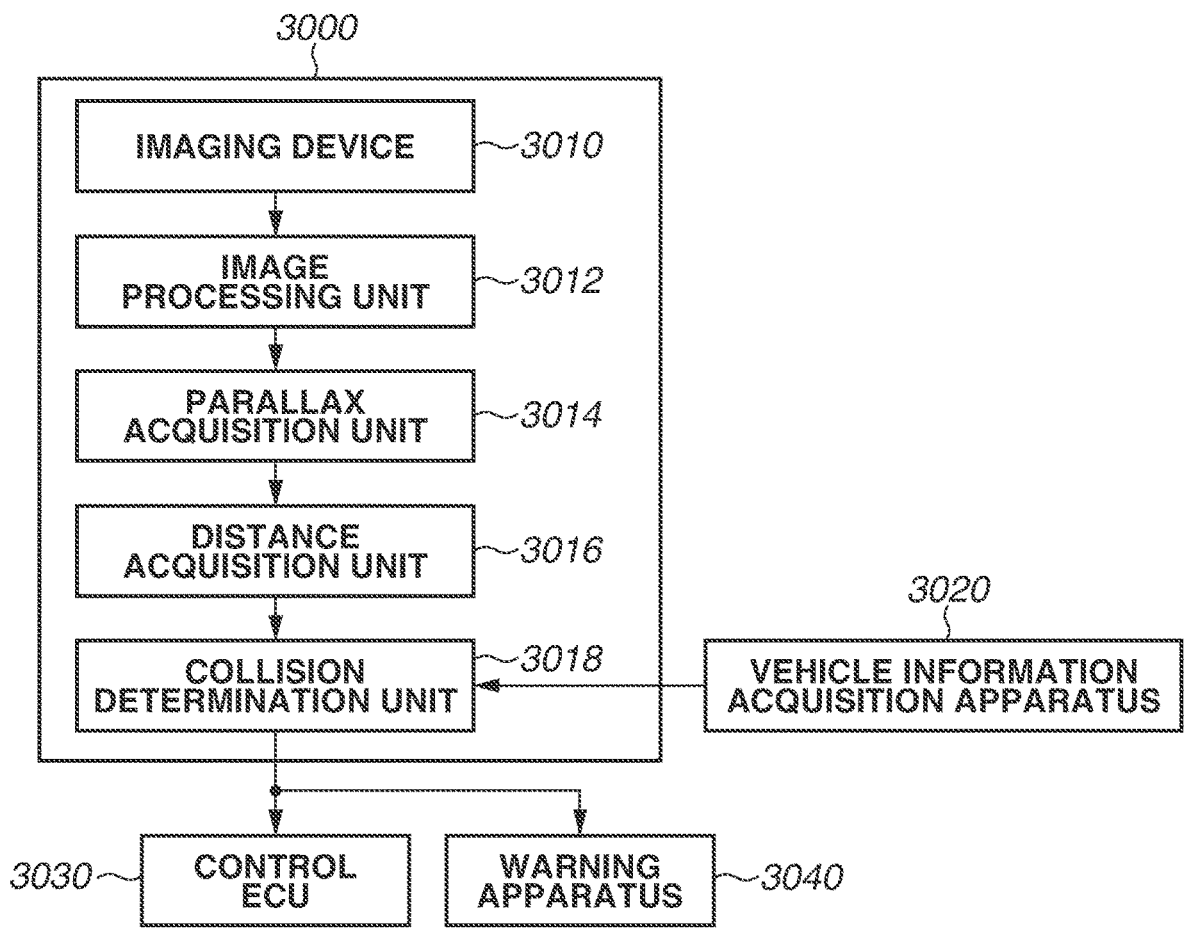
FIGS. 11A and 11B are diagrams illustrating a configuration and operation of a movable object according to a ninth exemplary embodiment.
Figure 11B:
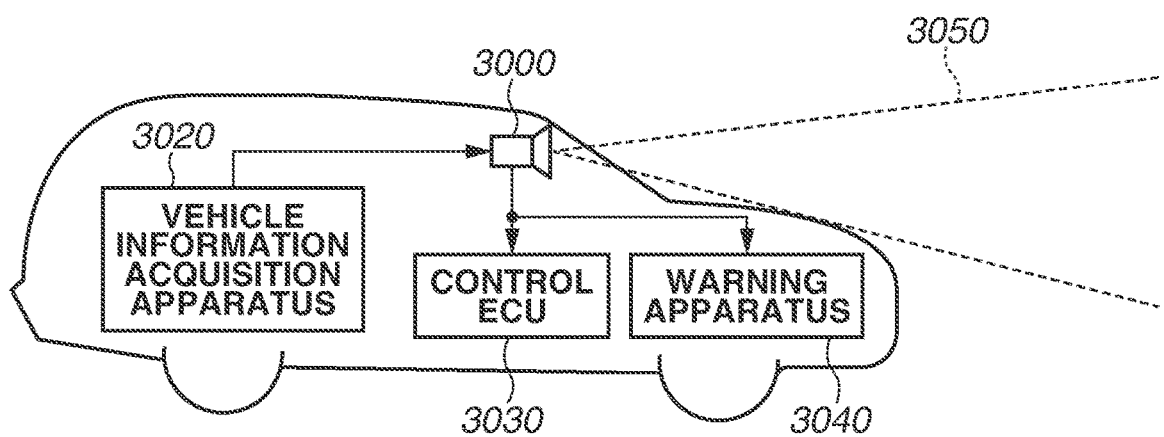

A photoelectric conversion system and a movable object according to a ninth exemplary embodiment will be described below with reference to FIGS. 11A and 11B. FIGS. 11A and 11B are diagrams illustrating configurations of the photoelectric conversion system and the movable object, respectively, according to the present exemplary embodiment.

FIG. 11A illustrates an example of the photoelectric conversion system that relates to an in-vehicle camera. A photoelectric conversion system 3000 includes an imaging device 3010. The imaging device 3010 is one of the photoelectric conversion apparatuses (imaging apparatuses) according to the above-described exemplary embodiments. The photoelectric conversion system 3000 includes an image processing unit 3012 and a parallax acquisition unit 3014. The image processing unit 3012 performs image processing on a plurality of pieces of image data acquired by the imaging device 3010. The parallax acquisition unit 3014 calculates a parallax (phase difference in parallax image) from a plurality of pieces of image data acquired by the photoelectric conversion system 3000. The photoelectric conversion system 3000 includes a distance acquisition unit 3016 and a collision determination unit 3018. The distance acquisition unit 3016 calculates a distance to a target object based on the calculated parallax. The collision determination unit 3018 determines whether there is a possibility of a collision based on the calculated distance. The parallax acquisition unit 3014 and the distance acquisition unit 3016 are merely examples of a distance information acquisition unit that acquires distance information about the distance to the target object. Specifically, the distance information refers to parallax information, defocus amount information, information about the distance to the target object, and the like. The collision determination unit 3018 may determine the possibility of a collision using any of the distance information. The distance information acquisition unit may be realized by dedicated hardware or software modules. The distance information acquisition unit may be realized by a field-programmable gate array (FPGA), an application-specific integrated circuit (ASIC), or a combination thereof.

The photoelectric conversion system 3000 is connected to a vehicle information acquisition apparatus 3020 and acquires vehicle information, such as vehicle velocity, yaw rate, and rudder angle. A control engine control unit (control ECU) 3030 is connected to the photoelectric conversion system 3000. The control ECU 3030 serves as a control unit that outputs a control signal for generating braking force against the vehicle based on a result of determination made by the collision determination unit 3018. A warning apparatus 3040 is also connected to the photoelectric conversion system 3000. The warning apparatus 3040 provides a warning to the driver based on the result of determination made by the collision determination unit 3018. For example, in a case where the result of determination made by the collision determination unit 3018 indicates that there is a high possibility of a collision, the control ECU 3030 performs vehicle control to avoid collision and reduce damage by, for example, applying a brake, releasing an accelerator, and/or reducing engine output. The warning apparatus 3040 provides a warning to the user by, for example, sounding a warning, such as a sound, displaying warning information on a screen of a car navigation system, and/or vibrating a seat belt or a steering.

According to the present exemplary embodiment, an area around the vehicle, e.g., the front or back of the vehicle, is imaged using the photoelectric conversion system 3000. FIG. 11B illustrates a photoelectric conversion system in a case where the front (imaging range 3050) of the vehicle is imaged. The vehicle information acquisition apparatus 3020 transmits an instruction to the photoelectric conversion system 3000 or the imaging device 3010. With this configuration, distance measurement accuracy is further increased.

While the control to avoid a collision with another vehicle has been described above as an example, an application is also possible to the control of automated driving to follow another vehicle or the control of automated driving so as not to drive beyond a traffic lane. Furthermore, the photoelectric conversion system 3000 is applicable to not only movable objects (movable apparatuses), such as vehicles, but also other movable objects (movable apparatuses), such as ships, aircrafts, and industrial robots.

Furthermore, applications are not limited to movable objects, and applications to various devices that use object recognition, such as an intelligent transport system (ITS), are possible.

Modified Examples

The disclosure is not limited to the above-described exemplary embodiments, and various modifications are possible.

For example, an example where part of a configuration according to one of the exemplary embodiments is added to another exemplary embodiment and an example where part of a configuration according to one of the exemplary embodiments is replaced with part of a configuration according to another exemplary embodiment are also included in the exemplary embodiments of the disclosure.

The photoelectric conversion systems according to the eighth and ninth exemplary embodiments are mere examples of a photoelectric conversion system to which a photoelectric conversion apparatus is applicable, and the photoelectric conversion systems to which a photoelectric conversion apparatus according to an aspect of the embodiments is applicable is not limited to the configurations illustrated in FIGS. 10, 11A, and 11B.

Further, each circuit according to the exemplary embodiments of the disclosure may be formed on a single semiconductor substrate or may be arranged on two or more semiconductor substrates and the substrates may be bonded together to form a layered structure. For example, a layered structure including three or more substrates may be formed by dividing a circuit or adding a circuit or function.

The above-described exemplary embodiments are mere examples of implementations of the disclosure, and the technical scope of the disclosure should not be interpreted narrowly based on the above-described exemplary embodiments. Specifically, the disclosure can be implemented in various forms without departing from the technical concept or major feature of the disclosure.

The aspect of the embodiments limits an amplitude of an output signal to a desired voltage even in a case where a bias electric current of an output circuit is changed.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-215241, filed Dec. 24, 2020, which is hereby incorporated by reference herein in its entirety.

What is claimed is:

1. A circuit comprising:
a comparator configured to compare an input signal and another signal and output a signal indicating a result of a comparison; and
an element configured to limit an amplitude of the signal indicating the result of the comparison,
wherein, in a case where a current flowing through the circuit is changed, the element is able to make an adjustment of a range of a change in the amplitude due to the change in the current.

2. The circuit according to claim 1,
wherein the element includes a plurality of amplitude elements, and
wherein the adjustment includes setting a first state in which the plurality of amplitude elements is connected in series and setting a second state different from the first state in the number of amplitude elements connected in series.

3. The circuit according to claim 1,
wherein the element includes a plurality of amplitude elements, and
wherein the adjustment includes setting a first state in which the plurality of amplitude elements is connected in parallel and setting a second state different from the first state in the number of amplitude elements connected in parallel.

4. The circuit according to claim 1, wherein the adjustment is correcting the change in the amplitude due to the change in the current.

5. The circuit according to claim 1, wherein the adjustment includes changing a bias voltage to be supplied to the element.

6. The circuit according to claim 5, wherein, in a case where the current flowing through the circuit is to be decreased, the bias voltage is decreased.

7. The circuit according to claim 6, wherein, in a case where the current flowing through the circuit is to be increased, the bias voltage is increased.

8. The circuit according to claim 1, wherein, in the adjustment, a power source voltage to be supplied to the comparator is changeable.

9. The circuit according to claim 1, wherein the element has a variable channel width.

10. The circuit according to claim 1,
wherein the comparator includes a differential stage and an amplifier stage configured to receive an output of the differential stage, and
wherein the element limits an amplitude of the output of the differential stage which is the signal indicating the result of the comparison.

11. The circuit according to claim 1,
wherein the comparator includes a differential stage and an amplifier stage configured to receive an output of the differential stage, and
wherein the element limits an amplitude of an output of the amplifier stage which is the signal indicating the result of the comparison.

12. An apparatus comprising:
a plurality of pixels; and
the circuit according to claim 1,
wherein the plurality of pixels generates an electric charge based on incident light, and a signal based on the electric charge serves as the input signal.

13. A system comprising:
the apparatus according to claim 12; and
a processing unit configured to generate an image using a signal output from the circuit.

14. A movable object including an apparatus according to claim 12, the movable object comprising a control unit configured to control movement of the movable object using a signal output from the apparatus.

15. The apparatus according to claim 12, wherein in the circuit, the adjustment is correcting the change in the amplitude due to the change in the current.

16. The apparatus according to claim 12, wherein in the circuit, the adjustment includes changing a bias voltage to be supplied to the element.

17. A circuit comprising:
a comparator configured to compare an input signal and another signal and output a signal indicating a result of the comparison; and
an element configured to limit an amplitude of the signal indicating the result of the comparison,
a current source configured to supply a current to the circuit,
wherein the element includes a first amplitude element, a second amplitude element connected to the first amplitude element in series, and a switch connected to the second amplitude element in parallel, or the element includes a first amplitude element, a second amplitude element connected to the first amplitude element in parallel, and a switch connected to the second amplitude element in series, and
wherein the current source and the switch are controlled by a control unit.

18. The circuit according to claim 17, wherein, in the control, a power source voltage to be supplied to the comparator is changeable.

19. A substrate to be layered on another substrate, the substrate comprising:
a comparator configured to compare an input signal and another signal and output a signal indicating a result of the comparison; and
an element configured to limit an amplitude of the signal indicating the result of the comparison,
wherein, in a case where a current flowing through the circuit is changed, the element is able to make an adjustment so as to change a range of a change in the amplitude due to the change in the current.

20. A substrate to be layered on another substrate, the substrate comprising:
a comparator configured to compare an input signal and another signal and output a signal indicating a result of the comparison; and
a circuit including an element configured to limit an amplitude of the signal indicating the result of the comparison,
a current source configured to supply a current to the circuit,
wherein the element includes a first amplitude element, a second amplitude element connected to the first amplitude element in series, and a switch connected to the second amplitude element in parallel, or the element includes a first amplitude element, a second amplitude element connected to the first amplitude element in parallel, and a switch connected to the second amplitude element in in series, and
wherein the current source and the switch are controlled by a control unit.

* * * * *